United States Patent [19]

Holter et al.

[11] Patent Number: 4,617,725

[45] Date of Patent: Oct. 21, 1986

[54] METHOD OF MAKING MULTIPLE-ELEMENT STRAP WINDING FOR ROTOR POLE

[75] Inventors: Warren G. Holter, Bradenton, Fla.; Lawrence V. Van Laanen, West Allis, Wis.

[73] Assignee: Siemens-Allis, Inc., Atlanta, Ga.

[21] Appl. No.: 656,351

[22] Filed: Oct. 1, 1984

[51] Int. Cl.[4] .......................................... H02K 15/095
[52] U.S. Cl. ...................................... 29/598; 29/605; 140/92.1; 242/7.03; 310/194
[58] Field of Search .......................... 29/596, 598, 605; 310/42, 45, 143, 269

[56] References Cited

U.S. PATENT DOCUMENTS

| | | | |
|---|---|---|---|
| 3,171,993 | 3/1965 | Stevens et al. | 310/269 X |
| 3,600,801 | 8/1971 | Larsen | 29/596 X |

OTHER PUBLICATIONS

R. W. Smeaton, "Motor Application and Maintenance Handbook", 1969, p. 11-10.

Primary Examiner—Carl E. Hall
Attorney, Agent, or Firm—F. W. Powers; J. L. James

[57] ABSTRACT

A method for producing a winding for large AC salient pole dynamoelectric machine comprising winding an array of conductors in edgewise fashion about a pole body and then securing the conductor ends such that the array forms a single layer edgewise wound conductor.

2 Claims, 2 Drawing Figures

METHOD OF MAKING MULTIPLE-ELEMENT STRAP WINDING FOR ROTOR POLE

BACKGROUND OF THE INVENTION

The present invention relates to windings for dynamoelectric machines, and more particularly to an improved method of forming a single-layer winding for a salient pole of the rotor of an AC machine.

Alternating current dynamoelectric machines, i.e., motors and generators, which are of the salient-pole type are conventionally provided with pole windings of one of two types. The most common type is termed a "wire-wound" pole inasmuch as the winding is formed of multiple layers of insulated wire wound round and round the pole. For small machines such wires are wrapped in more or less random fashion, having no discrete layers, the primary objective being to provide the appropriate number of turns about a magnetic core. For larger machines, a heavier conductor is used and is frequently hand-wound about a pole or pole form in precise fashion, and arranged in discrete rows and layers. Oftentimes a bonding compound such as epoxy resin is applied to the wires so that the finished winding can be cured and bonded into a solid mass. In a few cases, such windings have been comprised of two or three parallel wires which are wrapped about a core or form to produce a number of layers and the conductors connected in parallel, which effectively halves the total number of turns, but at the same time allowing a greater current flow to occur.

Another, less frequently used winding is the "strap winding" which is formed of a single copper bar that is wound in edgewise fashion about a form. Such windings are only utilized for very large machines such as hydrogenerators. Until the present invention, it has generally been considered that large high-speed machines using salient poles required strap-type windings for mechanical strength. Although to the casual observer the centrifugal forces on such a winding extend axially through the windings to compress them against the outermost end of a pole in fact the lateral pole faces, and therefore the winding axes, are not truly radial but instead lie tangent to a cylinder disposed concentrically with the axis of rotation. For this reason, there is generated a tangential force component which extends normal to the axis of the winding and attempts to push the winding outwardly, away from the pole. This force is resisted by strap-type windings owing to the fact that their width is much greater than their depth, and to a lesser extent, because of the mechanical bonding between successive turns. It is also known to provide mechanical clamps or the like between adjacent poles to resist such a tangential force, the apparent need for such clamps being greater for wire-type windings.

In addition to apparent mechanical strength, other reasons for using solid or strap-type windings include superior heat dissipation, wherein the solid copper bar which comprises each turn is uninterrupted by voids or insulation which would form a barrier to the outward transfer of heat within each turn. Still further, it is common to provide a narrow fin at the outer edge of the conductor, thereby forming a series of peripheral fins extending about each formed coil, which serve to dissipate heat.

Although an enormous array and variety of winding configurations have so far been attempted by manufacturers of dynamoelectric machines, including the use of layered or laminar strips of copper wound about the stator interpole windings in direct current machinery to eliminate problems in forming solid copper bars, to date single-depth windings for salient poles have only been produced by means of strap windings. The strap material for such windings is expensive, and moreover the labor involved in forming such windings on a turn-by-turn basis with special forming dies, then separately insulating each turn by hand, and subsequently forming the turns into a solid winding and curing the bonding resins, before assembling it to a pole, is an arduous and time-consuming task. Accordingly, it will be appreciated that it would be highly desirable to provide an improved winding for a salient rotor pole which utilizes more economical material, and requires less labor and handling, than those heretofore known while displaying the requisite electrical characteristics.

It is accordingly one object of the present invention to provide an improved single-layer winding for salient rotor poles of dynamoelectric machines.

Another object of the invention is to provide an improved method for forming single-depth windings on a rotor pole body.

Yet another object is to provide a method for forming a winding which exhibits the economy of manufacture of a wire winding, but exhibits the electrical characteristics of a strap-type winding.

SUMMARY OF THE INVENTION

Briefly stated, in accordance with one aspect of the invention the foregoing objects are achieved by providing a number of turns of a multi-strand formed winding, the strands being connected together at the ends thereof to form a number of electrically parallel paths, which unite to form a single winding. In a preferred embodiment, each strand exhibits a width-to-height ratio of at least 4:3 to provide the requisite physical strength, and such conductors are aligned edgewise to form a single-layer winding. The windings are formed directly upon a magnetic pole which is surrounded by a layer of ground insulation, each individual strand being insulated by a layer of varnish or similar insulation, and further surrounded by an epoxy resin. After winding, the strands are cured into a monolithic mass, and the extending ends thereof brazed together to couple the strands together to form an electrically common winding.

BRIEF DESCRIPTION OF THE DRAWING

While the specification concludes with claims particularly pointing out and distinctly claiming the subject matter which is regarded as the invention, it is believed that the invention will be better understood from the following description of a preferred embodiment taken in conjunction with the accompanying drawing in which

DESCRIPTION OF A PREFERRED EMBODIMENT

Figure 1:
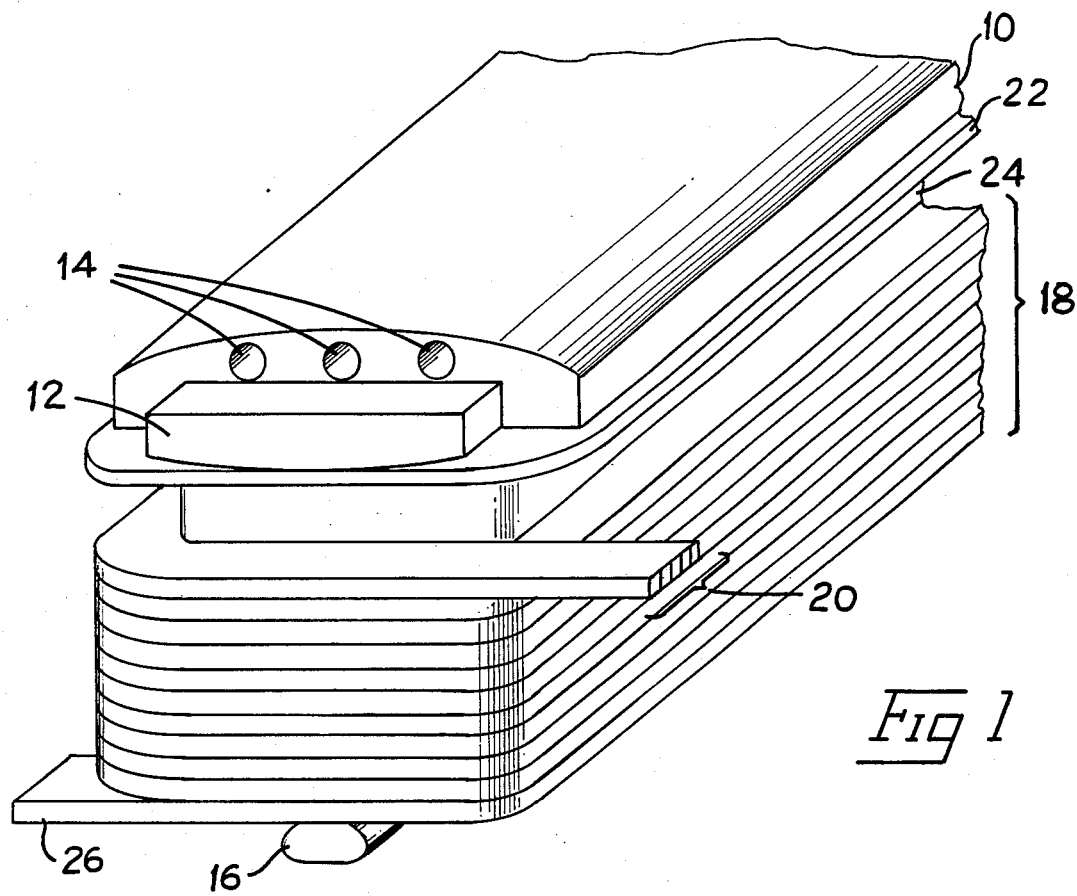
FIG. 1 is an oblique view of a partially-completed winding formed in accordance with the present invention.

FIG. 1 illustrates a partially-wound pole assembly which includes a pole body 10 comprising a number of laminations which have been stacked together and clamped between a pair of endplates, one of which is visible and identified as 12. Each lamination is provided with several openings 14 which form holes running through the pole body for receiving copper or brass rods which are coupled together to form an Amortisseur winding. At the bottom (radially innermost) end of the pole body is formed a dovetail 16 which is introduced into a mating slot in a machine rotor for retaining the pole in conventional fashion.

The pole body is surrounded by a single-layer metal winding generally indicated at 18. With prior art pole assemblies such windings were formed of a length of copper bar, or strap. The strap was formed into the requisite shape by bending it about a forming fixture, then each turn of the resulting spiral was insulated by inserting a strip of insulation above each turn in the manner of a helix, then pressing the windings together and bonding them together. The finished winding was then slid onto a pole body, and affixed in place by means of an epoxy resin and/or mechanical clamping devices.

With the present invention, however, the requisite single-layer turns are formed by a number of parallel conductors generally indicated at 20. Such conductors may be wound directly upon the pole body as shown, either one strand at a time, or by applying multiple strands to form the configuration shown.

Figure 2:
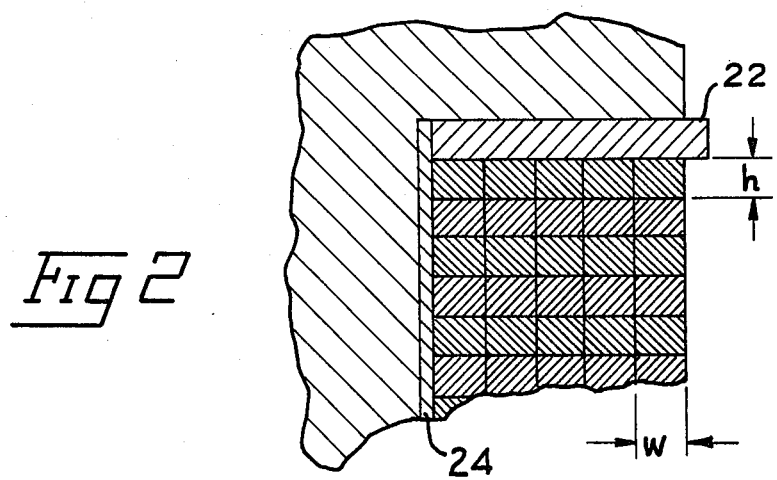
FIG. 2 is a cross-sectional view of a portion of the winding illustrated in FIG. 1.

In order to form a winding of the type depicted, the pole body is prepared by wrapping with a ground or body insulation 24 and inserting a rigid insulative collar 22 over the pole body, after having an appropriate epoxy resin applied thereto as illustrated in further detail at FIG. 2. In a presently preferred embodiment, the body insulation is formed of Nomex, which is a registered trademark for a polyamide fiber-paper material manufactured by E. I. Dupont Company of Wilmington, Del. The resin which is utilized to bond the groundwall insulation to the pole body, and for securing together the various strands of the winding, is preferably a thermosetting insulative resin such as that designated U300 epoxy resin, manufactured by the Sterling Division of Reichhold Chemicals, Inc. of Sewickly, Penna.

Formation of the winding upon the pole body proceeds much as with a conventional wire-wound pole in that pole body 10 is disposed upon a turntable or similar device, and rotated while conductors 20 are wrapped about the pole body in the manner depicted in FIG. 1. With one approach, the layers are applied individually or in sets of two or three, with repeated operations adding successive strands in order to build up the depth of the turn required to a depth of five or more strands. In another approach, all of the required strands are applied at the same time, so that in the depicted embodiment a total of five strands will be wrapped about the pole body at one time.

Such an approach has apparent deficiencies, although the applicants have determined that in practice their method is feasible. In particular, the applicants have found by utilizing strands insulated with a flexible varnish such as that termed HTP, a heavy terephtalic polyester film, there is sufficient flexibility to allow several conductors to be simultaneously wrapped about a pole corner, each winding strand thereby exhibiting different radius, and sliding relative to one another to accomodate the difference in path length. Moreover, applicants simultaneously apply a liquid epoxy bonding resin, such as the U300 material mentioned above, to the strands as they are wound upon the pole. This introduces a bonding agent, not only from layer to layer, but also from strand to strand so that after curing each strand becomes an integral part of the mass of winding.

After being wound on the pole body the epoxy material is cured so that the winding and pole body are formed into one solid mass. Subsequent to this the protruding winding ends such as shown at 26 in FIG. 1 are scraped or brushed clean and brazed together, securing the individual strands together into a solid mass ready for brazing to the lead of an adjacent winding. This also unites the ends of the strands together to produce a group of electrically parallel conductors.

Although the lengths of the various conductors differ markedly owing to the longer distances traversed by the outermost conductors, it has been found that they act as a single conductor, effectively taking the place of the single piece or strap-wound coil used in the past. Moreover, it has been found that the apparent differences in resistance and thermal expansion which result from the strand lengths do not cause electrical or mechanical difficulties.

As shown in FIG. 2, each strand of a turn is insulated from the others by the varnish and epoxy which has been applied thereto. It has been discovered, however, that although the insulating materials in effect interrupt each turn and therefore impede heat transfer through the turn, as compared to prior art one-piece strap windings, heat transfer is not so impeded as to prohibitively raise the temperature of the winding. While the use of multiple identical strands precludes the provision of fins or other cooling formations at the outermost edge of each turn, sufficient heat transfer can be established to maintain the temperature of the windings within a desired range. Still further, the inventors have determined that by properly sizing the copper strands sufficient lateral strength can be achieved to resist the centrifugal forces generated when the pole assembly is in motion. In particular, it has been found that by maintaining the width w of each strand substantially greater than the hight thereof, the width-to-height ratio preferably remaining in the range of about 4:3, the resulting compounded mass of winding strands will exhibit a relatively high resistance to lateral deflection despite the fact that the windings are formed of multiple individual strands, rather than edgewise strap material. It should now be understood that there has been disclosed an improved method for producing a wound salient pole for an AC machine rotor, having the functional electrical advantages of prior art strap-wound coils, but formed by individual strands which are electrically connected in parallel. Moreover, a winding of the type described exhibit the advantages of having been formed directly upon the pole body with which they are to be used, in addition to being simpler to manufacture and requiring less expensive materials than equivalent windings which have heretofore been known.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and scope of the invention.

What is claimed is new and desired to be secured by Letters Patent of the United States is:

1. The method of producing a winding for large AC salient pole dynamoelectric machines, comprising the steps of providing a pole formed of a magnetic material;

surrounding the body of said pole with flexible pole insulation material;

disposing a collar formed of substantially rigid insulating material over said pole and an adjacent head portion;

providing a plurality of insulated conductors arranged side by side to form an array having a lateral dimension equal to the sum of the diameters of all of the conductors in the array, each of said conductors having a width to height ratio of at least 4:3 and being provided with a resilient varnish insulation thereon said width being measured in the same direction as said lateral dimension;

securing one end of said conductor array adjacent said pole body;

applying a curable resinous material to said array;

rotating said pole about an axis generally perpendicular to the lateral dimension of said array to cause said array to be wrapped around said pole body edgewise to form a single layer of edgewise wound array turns about said body;

curing said resinous material; and brazing together the ends of the conductors in said array to form a single-layer winding about said pole body.

2. A method according to claim 1, wherein said array comprises at least five conductors.

* * * * *